_(12)_ United States Patent
Hingne et al.

(10) Patent No.: US 11,678,595 B2
(45) Date of Patent: Jun. 20, 2023

(54) THREE-POINT HITCH FOR AN AGRICULTURAL TRACTOR

(71) Applicant: DEERE & COMPANY, Moline, IL (US)

(72) Inventors: Abhijit Hingne, Khamgaon (IN); Achim Schibel, Heidelberg (DE)

(73) Assignee: DEERE & COMPANY, Moline, IL (US)

( * ) Notice: Subject to any disclaimer, the term of this patent is extended or adjusted under 35 U.S.C. 154(b) by 328 days.

(21) Appl. No.: 17/065,713

(22) Filed: Oct. 8, 2020

(65) Prior Publication Data

US 2021/0127542 A1  May 6, 2021

(30) Foreign Application Priority Data

Oct. 30, 2019  (DE) .......................... 102019216733.0

(51) Int. Cl.
  *A01B 59/00*  (2006.01)
  *A01B 59/06*  (2006.01)
  *B60D 1/155*  (2006.01)

(52) U.S. Cl.
  CPC .......... *A01B 59/004* (2013.01); *A01B 59/068* (2013.01); *B60D 1/155* (2013.01)

(58) Field of Classification Search
  CPC ... A01B 59/004; A01B 59/068; A01B 59/066; A01B 59/062; A01B 59/043; B60D 1/155
  See application file for complete search history.

(56) References Cited

U.S. PATENT DOCUMENTS

| 2,673,508 | A | * | 3/1954 | Richey | A01B 59/065 |
| | | | | | 172/476 |
| 2,734,438 | A | * | 2/1956 | Todd | A01B 59/068 |
| | | | | | 172/272 |
| 2,844,083 | A | * | 7/1958 | Du Shane | A01B 63/112 |
| | | | | | 172/444 |

(Continued)

FOREIGN PATENT DOCUMENTS

| DE | 2147286 A1 | 3/1973 |
| DE | 2223888 A1 | 12/1973 |

(Continued)

OTHER PUBLICATIONS

European Search Report issued in European Patent Application No. 20198131.3, dated Mar. 24, 2021, 7 pages.

*Primary Examiner* — Jamie L McGowan

(57) ABSTRACT

A three-point hitch for an agricultural tractor includes a hydraulically actuatable lifting arm, a vertically pivotable lower link, and a lifting strut arranged between the lifting arm and the lower link. The lifting strut transmits to the lower link a pivoting movement on the lifting arm. The lifting strut includes a first fastening portion articulated to the lifting arm and a second fastening portion articulated to the lower link. The second fastening portion includes first and second fastening segments which encompass the lower link in a fork-shaped manner. A bearing pin disposed between the two fastening segments extends through a slot formed in the lower link. By pivoting the lower link, the bearing pin is displaced inside the slot between a first working position and a second working position. In each position, the bearing pin is secured inside the slot by a blocking arrangement.

16 Claims, 3 Drawing Sheets

(56) References Cited

U.S. PATENT DOCUMENTS

| | | | | |
|---|---|---|---|---|
| 3,404,901 A * | 10/1968 | Rau | ............... | B60D 1/155 280/504 |
| 3,515,412 A * | 6/1970 | Hartlieb | ............... | A01B 59/004 172/448 |
| 3,889,980 A * | 6/1975 | Geisthoff | ............... | A01B 59/006 172/449 |
| 4,039,201 A * | 8/1977 | Huitema | ............... | A01B 63/102 172/444 |
| 4,062,560 A * | 12/1977 | Mueller, Jr. | ............... | A01B 59/067 172/272 |
| 4,108,463 A * | 8/1978 | Old | ............... | A01B 59/041 172/450 |
| 6,148,927 A * | 11/2000 | Hoffart | ............... | A01B 59/064 172/439 |
| 6,149,180 A * | 11/2000 | Haws | ............... | B60D 1/141 280/491.2 |
| 7,658,569 B2 * | 2/2010 | de Oliveira | ............... | A01B 59/004 403/325 |
| 7,861,794 B2 * | 1/2011 | Tarasinski | ............... | A01B 59/068 172/439 |
| 7,975,776 B2 * | 7/2011 | Chimento | ............... | A01B 59/002 172/272 |
| 2003/0159842 A1 * | 8/2003 | Casali | ............... | A01B 59/041 172/450 |
| 2005/0098329 A1 * | 5/2005 | Nordhoff | ............... | A01B 63/1006 172/439 |
| 2007/0102168 A1 * | 5/2007 | Oliveira | ............... | A01B 59/004 172/272 |
| 2013/0037283 A1 * | 2/2013 | Laubner | ............... | A01B 59/004 172/439 |
| 2019/0123617 A1 * | 4/2019 | Bering | ............... | B62D 49/065 |
| 2019/0299731 A1 * | 10/2019 | Heimbuch | ............... | B60D 1/42 |
| 2019/0327877 A1 * | 10/2019 | Schibel | ............... | A01B 59/066 |
| 2020/0281108 A1 * | 9/2020 | Sundberg | ............... | A01B 59/043 |
| 2020/0346505 A1 * | 11/2020 | Loewen | ............... | B60D 1/363 |
| 2021/0127542 A1 * | 5/2021 | Hingne | ............... | A01B 59/004 |
| 2022/0330467 A1 * | 10/2022 | Heitlinger | ............... | A01B 59/066 |

FOREIGN PATENT DOCUMENTS

| | | | | |
|---|---|---|---|---|
| EP | 1332657 A1 | | 8/2003 | |
| EP | 2130420 A1 | * | 12/2009 | ............... A01B 59/004 |
| EP | 2556736 A1 | * | 2/2013 | ............... A01B 59/004 |
| EP | 2671440 A1 | | 12/2013 | |
| EP | 2671440 B1 | * | 6/2015 | ............... A01B 59/066 |
| EP | 3549417 A1 | | 10/2019 | |

* cited by examiner

THREE-POINT HITCH FOR AN AGRICULTURAL TRACTOR

RELATED APPLICATIONS

This application claims priority to German Application No. 102019216733.0, filed Oct. 30, 2019, the disclosure of which is hereby expressly incorporated by reference in its entirety.

FIELD OF THE DISCLOSURE

The present disclosure relates to a three-point hitch for an agricultural tractor, and in particular to a three-point hitch including a hydraulically actuatable lifting arm, a lower link and a lifting strut which is arranged therebetween for transmitting to the lower link a pivoting movement performed on the lifting arm.

BACKGROUND

A conventional three-point hitch, as arranged in a rear region of an agricultural tractor, includes a hydraulically actuatable lifting apparatus with left-hand and right-hand lifting arms which are able to pivot upwardly and downwardly by associated hydraulic cylinders, as well as left-hand and right-hand lower links which are mounted in a vertically pivotable manner on lower fastening points of the three-point hitch and which are connected in terms of movement to the lifting arms via longitudinally adjustable lifting struts. A central top link, which is suspended in a vertically pivotable manner on an upper fastening point of the three-point hitch, is also present. Both the lower links and the top link have coupling hooks for receiving complementary fastening elements of an attachment to be attached to the three-point hitch.

A first fastening portion, which is articulated to the relevant lifting arm, and a second fastening portion, which is articulated to the lower link and which has first and second fastening segments which encompass the lower link in a fork-shaped manner, are provided on each of the lifting struts. The lower link is mounted on the lifting strut by a removable retaining pin which is received by an elongated hole in the fastening segments, wherein the elongated hole serves for providing a vertical degree of freedom of movement and thus for implementing a corresponding floating position. This is required during the operation of specific ground-engaging attachments in order to compensate for variations in the ground, as they arise during the cultivation of a field. In addition, it is possible to fix the lower link inside the elongated hole in a bottom position by the retaining pin.

Generally, a towing jaw or a comparable coupling device is located between the two lower links for attaching a trailer drawbar of towed auxiliary devices, for example, of a trailer, hay loader or the like. When carrying out transport journeys, a lateral clearance which is as large as possible is desired between the trailer drawbar and the lower links in order to reduce the turning radius when maneuvering. In such a case, the lower links are moved by the hydraulic lifting apparatus into a position which is lifted up as high as possible.

There is a need, however, for a three-point hitch which permits an additional increase in the lateral clearance of a trailer drawbar running between the lower links.

SUMMARY

According to the present disclosure, a three-point hitch for an agricultural tractor comprises a hydraulically actuatable lifting arm, a lower link which is configured to be vertically pivotable and a lifting strut which is arranged therebetween for transmitting to the lower link a pivoting movement performed on the lifting arm, wherein the lifting strut has a first fastening portion which is articulated to the lifting arm and a second fastening portion which is articulated to the lower link and which has first and second fastening segments which encompass the lower link in a fork-shaped manner. In this case, a bearing pin running between the two fastening segments extends through a slot formed in the lower link such that by pivoting the lower link the bearing pin is displaced inside the slot between a first working position and a second working position and in each case may be secured therein by a blocking arrangement.

The blocking arrangement permits an adjustment of the point of articulation of the lifting strut on the lower link so that, for the purpose of increasing the lateral clearance of a trailer drawbar running between the lower links, the lower link is additionally lifted by the pivoting clearance provided by the slot and may be blocked in this position. In other words, the first working position corresponds to a conventional operating position, i.e., provided for operating an attachment, and the second working position corresponds to a transport position of the lower links provided for a transport mode.

The blocking arrangement has a holder with mounting cheeks running on either side of the lower link, the bearing pin and a blocking pin spaced apart therefrom being inserted through the mounting cheeks, wherein the spacing between the bearing pin and the blocking pin corresponds to the dimensions of the slot such that in the first working position the bearing pin bears substantially without play against a first end region of the slot and the blocking pin bears substantially without play against a second end region of the slot. In this case, a displacement of the holder along the slot is blocked by the two pins, and thus the holder is reliably secured in the first working position.

There is also the possibility that in the second working position the bearing pin bears substantially without play against the second end region of the slot and at the same time the blocking pin is inserted through a blocking bore configured in the lower link. The diameter of the blocking bore is selected such that the blocking pin is received therein substantially without play. In this regard, the holder is also reliably secured in the second working position.

For changing the working position, therefore, the blocking pin simply has to be removed from the holder. Subsequently, the holder may be moved into its respective other working position and secured by remounting the blocking pin. Since the bearing pin is still located in the holder, and thus the lifting strut and lower link remain connected together, the handling of the relatively heavy or cumbersome lower link is significantly facilitated when changing between the operating position and the transport position.

The slot which is arranged in the lower link may be configured as a first elongated hole, the bearing pin being guided therein substantially without play when the holder is displaced between the two working positions. The bearing pin may serve at the same time for mounting the lower link in a second elongated hole which is configured in the fastening segments. The second elongated hole permits the provision of a vertical degree of freedom of movement, and thus a floating position required for the operation of specific ground-engaging attachments.

The two mounting cheeks of the holder may also be rigidly connected together in the region of a bridge portion encompassing the lower link at least on one side. This facilitates the handling of the holder when changing between the two working positions since when the blocking pin is absent the two mounting cheeks are not able to move loosely relative to one another around the bearing pin.

In this case, the holder including the bridge portion may have an inner contour corresponding to an outer contour of the lower link such that this inner contour is guided along the lower link when the bearing pin is displaced inside the slot. More specifically, therefore, the inner faces of the mounting cheeks and the bridge portion at least in the displacement region run substantially without play along the outer face of the lower link. The bridge portion may extend, in particular, in the region of an upper face of the lower link and support the holder at that point such that this holder is guided according to the path of the slot and thus a locating of the respective working position is assisted, in the sense of a simplified mounting of the blocking pin.

Typically, the holder is configured as an integral cast part or forged part consisting of a steel alloy. The bores or seats provided for receiving the bearing pin or blocking pin are post-treated by machining.

It is also possible that the blocking pin is only able to be removed from the holder after releasing a securing element. It is thus possible to prevent in a reliable manner the blocking pin from inadvertently dropping out of the associated bore or seat due to vibrations or the like, resulting from travel. In the simplest case, the securing element is a cotter pin which is manually removable and which is inserted through the blocking pin in the region of a free end.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
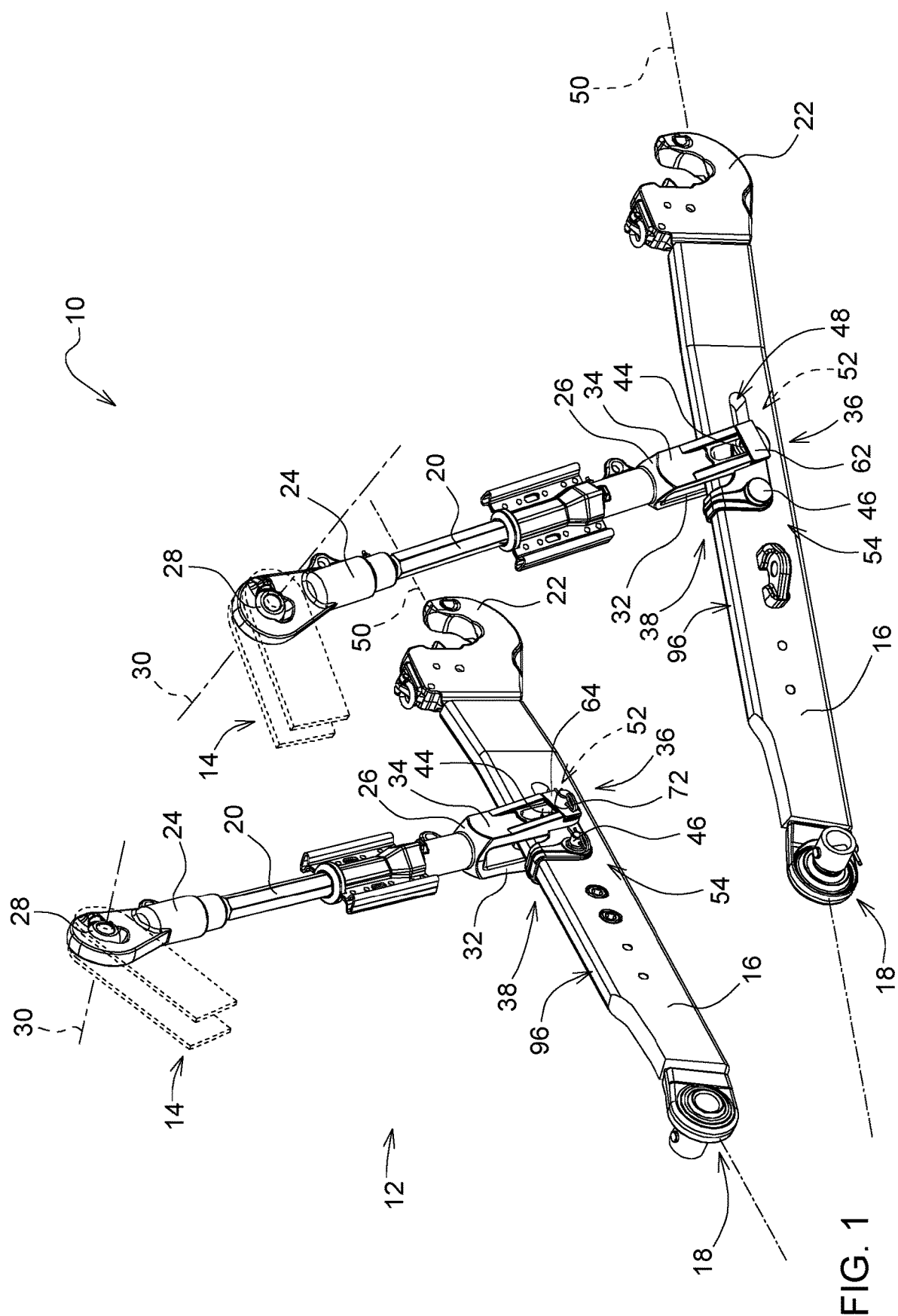
FIG. 1 shows a schematically illustrated three-point hitch for an agricultural tractor having a blocking arrangement for adjusting the point of articulation of a lifting strut on a lower link.
Figure 2:
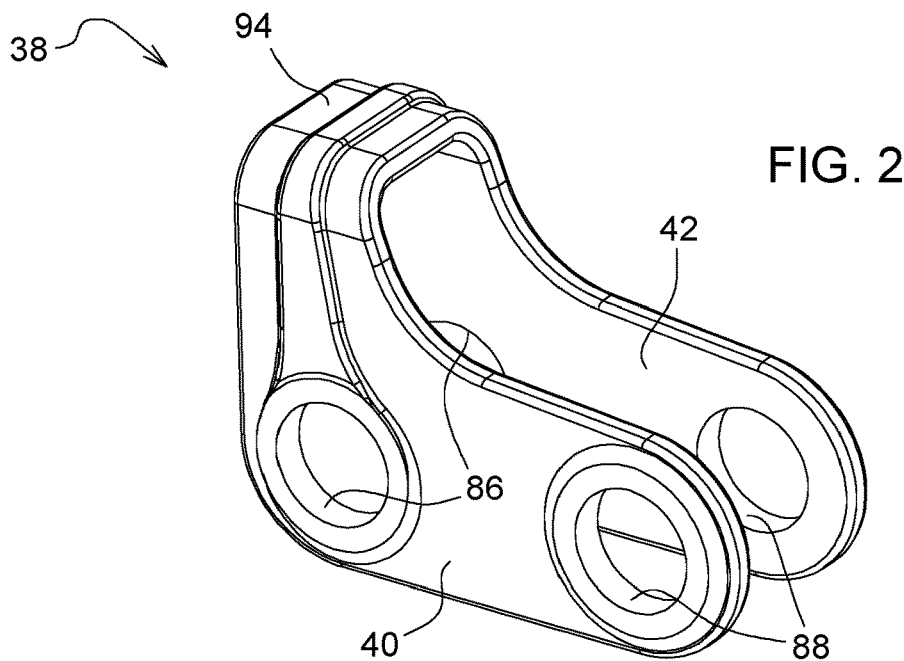
FIG. 2 shows a view of a holder encompassed by the blocking arrangement according to FIG. 1.

FIG. 1 shows in a schematic partial view an embodiment of a three-point hitch according to the present disclosure, wherein this three-point hitch is intended to be described with reference to the detailed views in FIGS. 2 to 5. For reasons of clarity, only the components of the three-point hitch which are essential to the present disclosure are shown. This also applies to a towing jaw located between the associated lower links or a comparable coupling device to which a trailer drawbar of towed auxiliary devices, i.e., a trailer, hay loader or the like, may be attached.

The three-point hitch 10 arranged in the rear region of a chassis or frame of an agricultural tractor (not illustrated) comprises a hydraulically actuatable lifting apparatus 12 with left-hand and right-hand lifting arms 14 which may be pivoted upwardly and downwardly by associated hydraulic cylinders (not shown), as well as left-hand and right-hand lower links 16 which are mounted in a vertically pivotable manner on lower fastening points 18 of the three-point hitch 10 and which are connected in terms of movement via longitudinally adjustable lifting struts 20 to the lifting arms 14 in order to transmit to the lower links 16 a pivoting movement performed on the lifting arms 14.

In contrast to the view in FIG. 1, the three-point hitch 10 also comprises a central top link which is suspended in a vertically pivotable manner on an upper fastening point of the three-point hitch 10. Both the lower links 16 and the top link have coupling hooks 22 for receiving complementary fastening elements of an attachment to be attached to the three-point hitch 10.

A first fastening portion 24 which is articulated to the associated lifting arm 14 and a second fastening portion 26 which is articulated to the lower link 16 are provided on each of the lifting struts 20. The first fastening portion 24 is a fastening eye 28 which is mounted by a pivot pin 30 in an end region of the lifting arm 14, whereas the second fastening portion 26 has first and second fastening segments 32, 34 which encompass the lower link 16 in a fork-shaped manner.

Moreover, on each of the two lower links 16 an identically constructed blocking arrangement 36 is provided for adjusting the point of articulation of the lifting strut 20 on the lower link 16. The blocking arrangement 36 has a holder 38 with mounting cheeks 40, 42 running on either side of the lower link 16 (see FIG. 2), a bearing pin 44 which is manually removable and a blocking pin 46 which is also manually removable and spaced apart therefrom being inserted through the mounting cheeks. The bearing pin 44 extends through a slot 48 which is arranged in the lower link 16 and which is oriented in the direction of a longitudinal axis 50 of the lower link 16. If the blocking pin 46 is removed (see FIG. 3), the holder 38 may be displaced between a first working position 52 (see FIG. 4) and a second working position 54 (see FIG. 5) for adjusting the point of articulation.

In this case, the slot 48 which is arranged in the lower link 16 is configured as a first elongated hole 56, the bearing pin 44 being guided therein substantially without play when the holder 38 is displaced between the two working positions 52, 54. The bearing pin 44 serves at the same time for mounting the lower link 16 in a second elongated hole 58 configured in the fastening segments 32, 34. The second elongated hole 58 permits the provision of a vertical degree of freedom of movement 60, and thus a floating position required for the operation of specific ground-engaging attachments. To this end, the bearing pin 44 is positioned manually such that a rectangular plate 62, 64 provided on the front face thereof comes to rest in a guide region 66 which is defined by the cheeks 68, 70 protruding along the second elongated hole 58 on the fastening segments 32, 34. Thus, the rectangular plate 62, 64 may freely move between the two cheeks 68, 70 along the second elongated hole 58. In order to permit a removal of the bearing pin 44, the rectangular plate 62, 64 is positioned in a manually releasable manner on one of the two sides of the bearing pin 44 and secured there by a cotter pin 72. If the lower link 16 is intended to be secured inside the second elongated hole 58, however, the removable bearing pin 44 is positioned such that the rectangular plate 62, 64 is brought to bear transversely against a lower front region 74, 76 of the two cheeks 68, 70. This situation is illustrated, among others, in FIG. 3.

Figure 4:
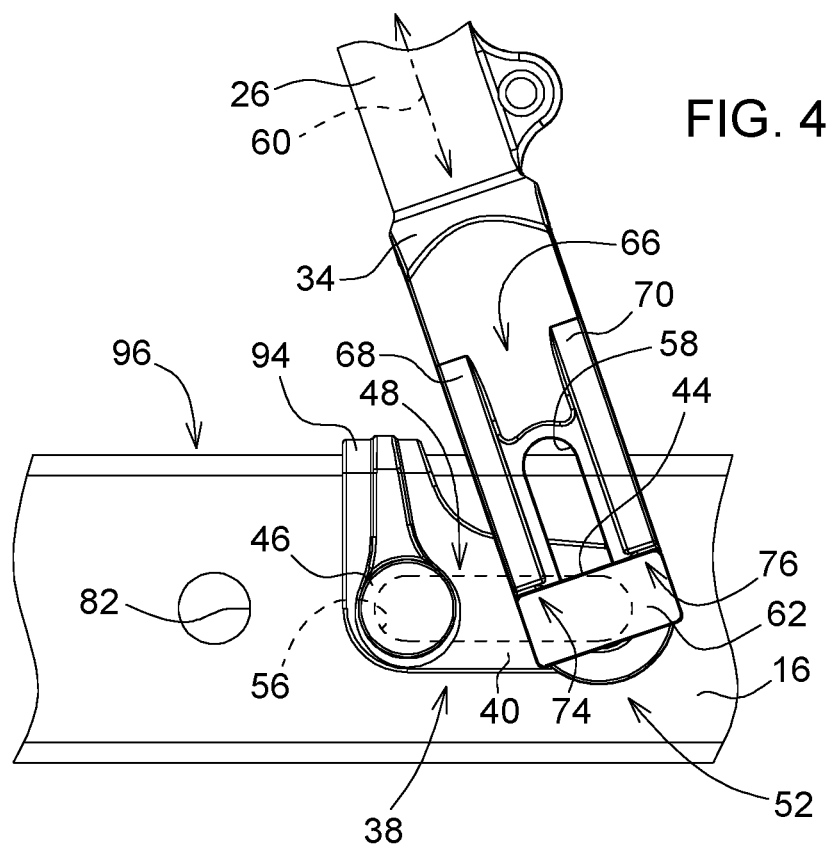
FIG. 4 shows a side view of the blocking arrangement illustrated in FIG. 1 with a holder located in a first working position.

The spacing between the bearing pin 44 and the blocking pin 46 corresponds to the dimensions of the first elongated hole 56 such that in the first working position 52 illustrated in FIG. 4, the bearing pin 44 bears against a first end region 78 of the first elongated hole 56 and the blocking pin 46 bears against a second end region 80 of the first elongated hole 56. The first elongated hole 56 is concealed in FIG. 4 by the holder 38 and thus is shown in dashed lines. A displacement of the holder 38 along the first elongated hole 56 in this case is blocked by the two pins 44, 46, and thus the holder 38 is reliably secured in the first working position 52.

Figure 5:
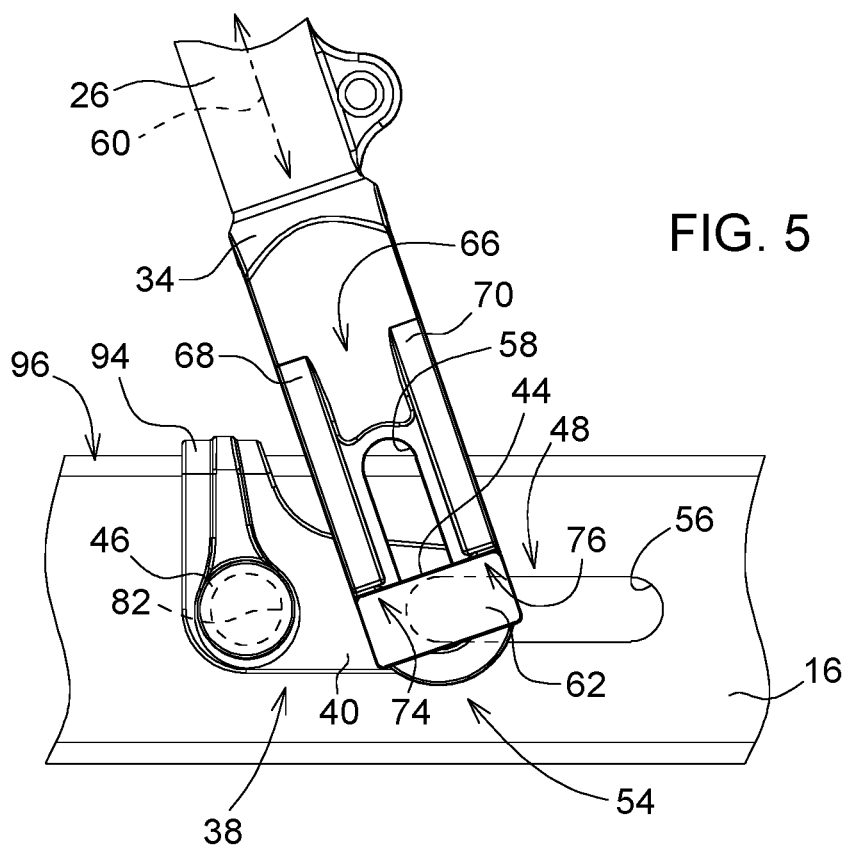
FIG. 5 shows a side view of the blocking arrangement illustrated in FIG. 1 with a holder located in a second working position.

On the other hand, the bearing pin 44 in the second working position 54 illustrated in FIG. 5 bears against the second end region 80 of the first elongated hole 56 and at the same time the blocking pin 46 is inserted through a blocking bore 82 configured in the lower link 16. The blocking bore 82 and a part of the first elongated hole 56 are concealed in FIG. 5 by the holder 38 and thus are shown in dashed lines. The diameter of the blocking bore 82 is selected such that the blocking pin 46 is received therein substantially without play. In this regard, the holder 38 is also reliably secured in the second working position 54.

For reasons of production technology and for ensuring sufficient tolerance relative to dirt deposits, the bearing pin 44 or blocking pin 46 generally does not directly bear against the respective end region 78, 80 of the first elongated hole 56 but instead has a certain degree of play which is, however, insignificant for the securing function to be fulfilled. The same applies to the blocking pin 46 received in the blocking bore 82 in the second working position 54.

Figure 3:
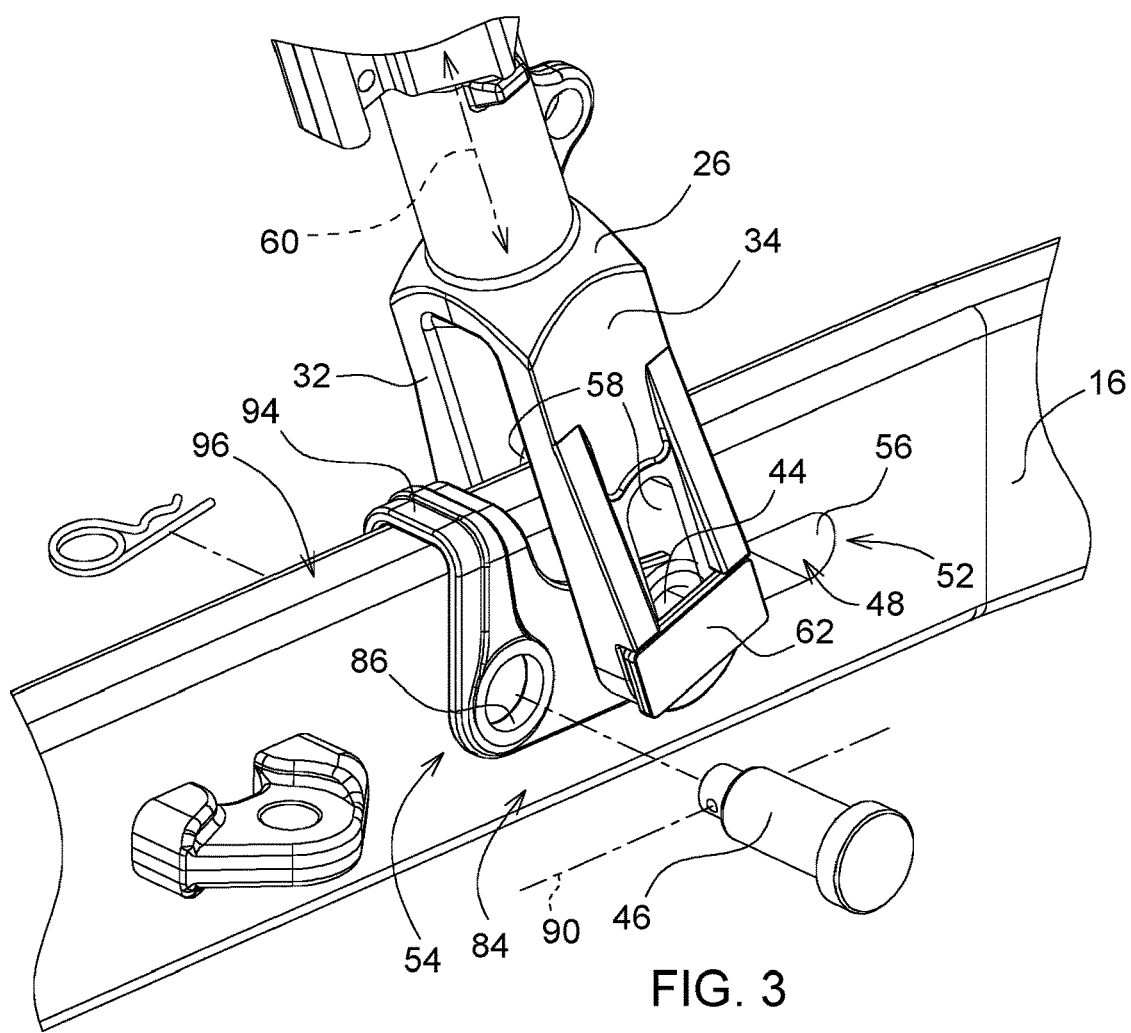
FIG. 3 shows a detailed view of the blocking device encompassed by the three-point hitch according to FIG. 1.

For changing the working position 52, 54, therefore, the blocking pin 46 simply has to be removed from the holder 38. Subsequently, the holder 38 may be moved manually into its respective other working position 54, 52 and secured by remounting the blocking pin 46. This procedure is illustrated in FIG. 3. Since the bearing pin 44 in the meantime is still located in the holder 38, and thus the lifting strut 20 and the lower link 16 remain connected together, the handling of the relatively heavy or cumbersome lower link 16 is significantly facilitated when adjusting the point of articulation.

It is also possible that the blocking pin 46 is only able to be removed from the holder 38 after releasing a securing element 84. It is thus possible to prevent in a reliable manner the blocking pin from inadvertently dropping out of the associated bore or seat 86, 88 due to vibrations or the like, resulting from travel. In the simplest case the securing element 84 is a cotter pin 90 which is manually removable and which is inserted through the blocking pin 46 in the region of a free end 92.

In other words, for the purpose of increasing the lateral clearance of a trailer drawbar running between the lower links 16, the blocking arrangement 36 makes it possible to lift the lower link 16 additionally by the pivoting clearance provided by the first elongated hole 56, and to block the lower link in this position.

In the present case, the two mounting cheeks 40, 42 of the holder 38 are rigidly connected together in the region of a bridge portion 94 encompassing the lower link 16 at least on one side. This additionally facilitates the handling of the holder 38 when changing between the two working positions 52, 54 since when the blocking pin 46 is absent the two mounting cheeks 40, 42 are not able to move loosely relative to one another about the bearing pin 44.

The holder 38 including the bridge portion 94 has an inner contour corresponding to an outer contour of the lower link 16 such that this inner contour is guided along the lower link 16 when the bearing pin 44 is displaced inside the first elongated hole 56. More specifically, therefore, the inner faces of the mounting cheeks 40, 42 and of the bridge portion 94 run substantially without play along the outer face of the lower link 16, at least in the displacement region. The bridge portion 94 extends in the region of an upper face 96 of the bottom link 16 and supports the holder 38 at that point such that this holder is guided according to the path of the first elongated hole 56 and thus a locating of the respective working position 52, 54 is assisted, in the sense of a simplified mounting of the blocking pin 46.

The outer contours of the two lower links 16 coincide with one another at least in the displacement region so that the same holder 38 is usable for both sides.

The holder 38 is configured as an integral cast part or forged part consisting of a steel alloy. The bores or clearances 86, 88 provided for receiving the bearing pin or blocking pin 44, 46 are post-treated by machining.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A three-point hitch for an agricultural tractor, comprising:
   a hydraulically actuatable lifting arm;
   a vertically pivotable lower link; and
   a lifting strut arranged between the lifting arm and the lower link, the lifting strut configured to transmit to the lower link a pivoting movement on the lifting arm;
   wherein the lifting strut comprises a first fastening portion articulated to the lifting arm and a second fastening portion articulated to the lower link, the second fastening portion comprising first and second fastening segments which encompass the lower link in a fork-shaped manner;
   wherein a bearing pin disposed between the two fastening segments extends through a slot formed in the lower link;
   wherein by pivoting the lower link, the bearing pin is displaced inside the slot between a first working position and a second working position;
   wherein in each position, the bearing pin is secured inside the slot by a blocking arrangement;
   wherein the blocking arrangement comprises a holder with mounting cheeks running on either side of the lower link;
   wherein the bearing pin and a blocking pin are spaced apart therefrom and inserted through the mounting cheeks; and wherein the spacing between the bearing pin and the blocking pin corresponds to the dimensions of the slot such that in the first working position the bearing pin bears substantially without play against a first end region of the slot, and the blocking pin bears substantially without play against a second end region of the slot.

2. Three-point hitch of claim 1, wherein, in the second working position, the bearing pin bears substantially without play against the second end region of the slot and at the same time the blocking pin is inserted through a blocking bore in the lower link.

3. Three-point hitch of claim 1, wherein:
the slot arranged in the lower link comprises a first elongated hole;
the bearing pin is guided therein substantially without play when the holder is displaced between the two working positions.

4. The three-point hitch of claim 1, wherein the bearing pin simultaneously mounts the lower link in a second elongated hole disposed in the fastening segments.

5. The three-point hitch of claim 1, wherein the two mounting cheeks of the holder are rigidly connected together in the region of a bridge portion encompassing the lower link.

6. The three-point hitch of claim 5, wherein the holder including the bridge portion comprises an inner contour corresponding to an outer contour of the lower link such that the inner contour is guided along the lower link when the bearing pin is displaced inside the slot.

7. The three-point hitch of claim 1, wherein the holder comprises an integral cast part or forged part including a steel alloy.

8. The three-point hitch of claim 1, wherein the blocking pin is only removable from the holder after releasing a securing element.

9. An agricultural tractor, comprising:
a chassis; and
a three-point hitch coupled to the chassis, the three-point hitch comprising:
 a hydraulically actuatable lifting arm;
 a vertically pivotable lower link; and
 a lifting strut arranged between the lifting arm and the lower link, the lifting strut configured to transmit to the lower link a pivoting movement on the lifting arm;
 wherein the lifting strut comprises a first fastening portion articulated to the lifting arm and a second fastening portion articulated to the lower link, the second fastening portion comprising first and second fastening segments which encompass the lower link in a fork-shaped manner;
 wherein a bearing pin disposed between the two fastening segments extends through a slot formed in the lower link;
 wherein by pivoting the lower link, the bearing pin is displaced inside the slot between a first working position and a second working position;
 wherein in each position, the bearing pin is secured inside the slot by a blocking arrangement;
 wherein the blocking arrangement comprises a holder with mounting cheeks running on either side of the lower link;
 wherein the bearing pin and a blocking pin are spaced apart therefrom and inserted through the mounting cheeks; and
 wherein the spacing between the bearing pin and the blocking pin corresponds to the dimensions of the slot such that in the first working position the bearing pin bears substantially without play against a first end region of the slot, and the blocking pin bears substantially without play against a second end region of the slot.

10. Three-point hitch of claim 9, wherein, in the second working position, the bearing pin bears substantially without play against the second end region of the slot and at the same time the blocking pin is inserted through a blocking bore in the lower link.

11. Three-point hitch of claim 9, wherein:
the slot arranged in the lower link comprises a first elongated hole;
the bearing pin is guided therein substantially without play when the holder is displaced between the two working positions.

12. The three-point hitch of claim 9, wherein the bearing pin simultaneously mounts the lower link in a second elongated hole disposed in the fastening segments.

13. The three-point hitch of claim 9, wherein the two mounting cheeks of the holder are rigidly connected together in the region of a bridge portion encompassing the lower link.

14. The three-point hitch of claim 13, wherein the holder including the bridge portion comprises an inner contour corresponding to an outer contour of the lower link such that the inner contour is guided along the lower link when the bearing pin is displaced inside the slot.

15. The three-point hitch of claim 9, wherein the blocking pin is only removable from the holder after releasing a securing element.

16. A three-point hitch for an agricultural tractor, comprising:
a hydraulically actuatable lifting arm;
a vertically pivotable lower link; and
a lifting strut arranged between the lifting arm and the lower link, the lifting strut configured to transmit to the lower link a pivoting movement on the lifting arm;
a first fastening portion of the lifting strut articulated to the lifting arm;
a second fastening portion of the lifting strut articulated to the lower link, the second fastening portion comprising first and second fastening segments which encompass the lower link in a fork-shaped manner;
a bearing pin disposed between the two fastening segments extends through a slot formed in the lower link, wherein by pivoting the lower link the bearing pin is displaced inside the slot between a first working position and a second working position, the bearing pin being secured inside the slot by a blocking arrangement in each position; and
a blocking pin spaced apart from the bearing pin, wherein the blocking pin is removable from a holder after releasing a securing element;
wherein the blocking arrangement comprises a holder with mounting cheeks running on either side of the lower link;
wherein the bearing pin and a blocking pin are spaced apart therefrom and inserted through the mounting cheeks; and
wherein the spacing between the bearing pin and the blocking pin corresponds to the dimensions of the slot such that in the first working position the bearing pin bears substantially without play against a first end region of the slot, and the blocking pin bears substantially without play against a second end region of the slot.

\* \* \* \* \*